Figure 13:
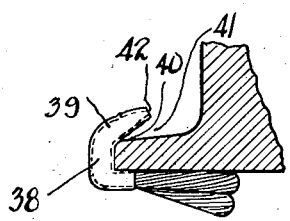

Sept. 10, 1935.  C. A. CADWELL  2,014,278
RAIL BONDING
Filed Dec. 5, 1929  3 Sheets-Sheet 1
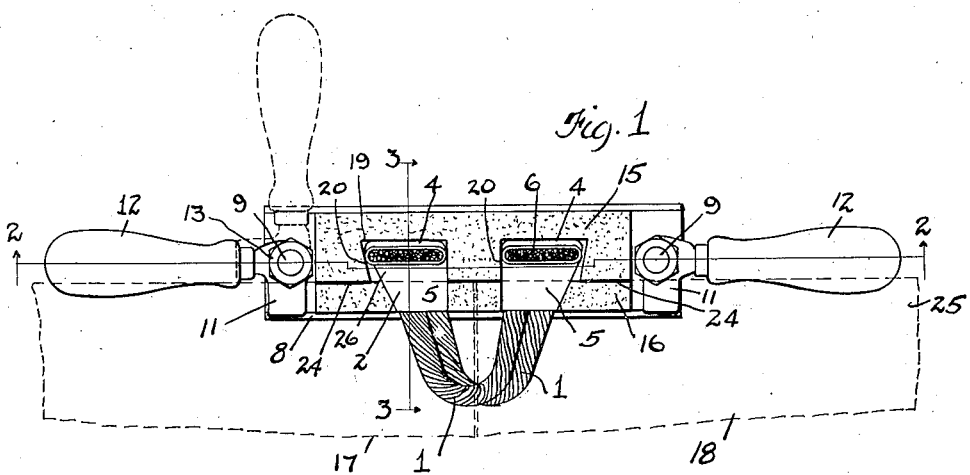
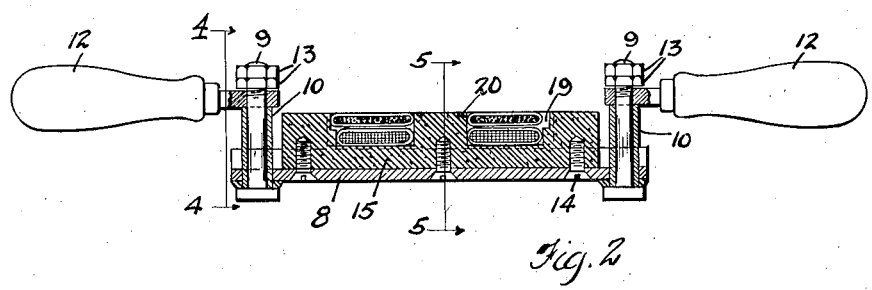
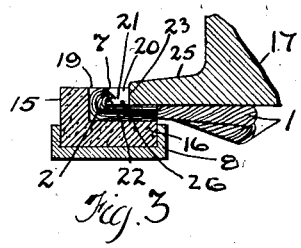
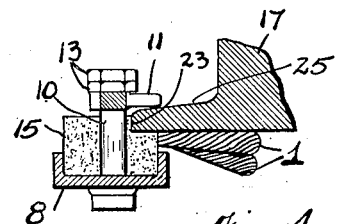
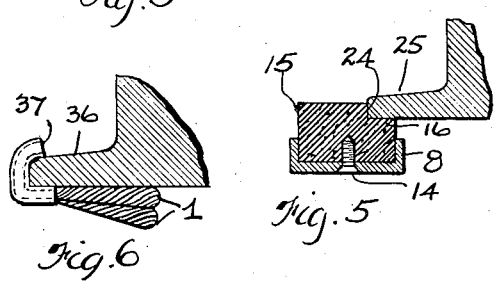
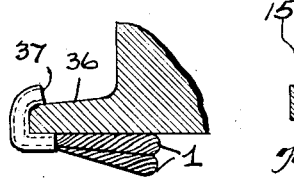
INVENTOR.
Charles A. Cadwell
BY
Fay, Oberlin & Fay
ATTORNEYS.

Sept. 10, 1935. C. A. CADWELL 2,014,278
RAIL BONDING
Filed Dec. 5, 1929 3 Sheets-Sheet 2
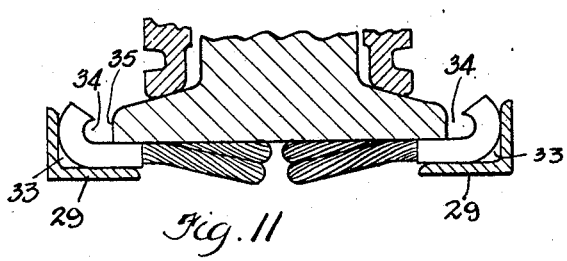
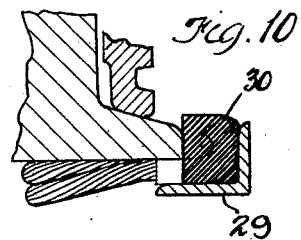
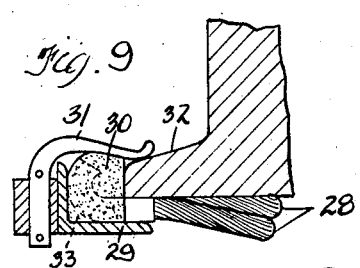
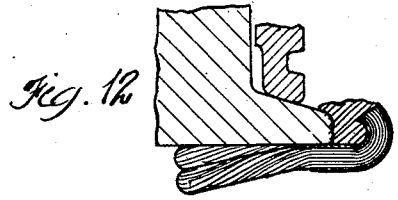
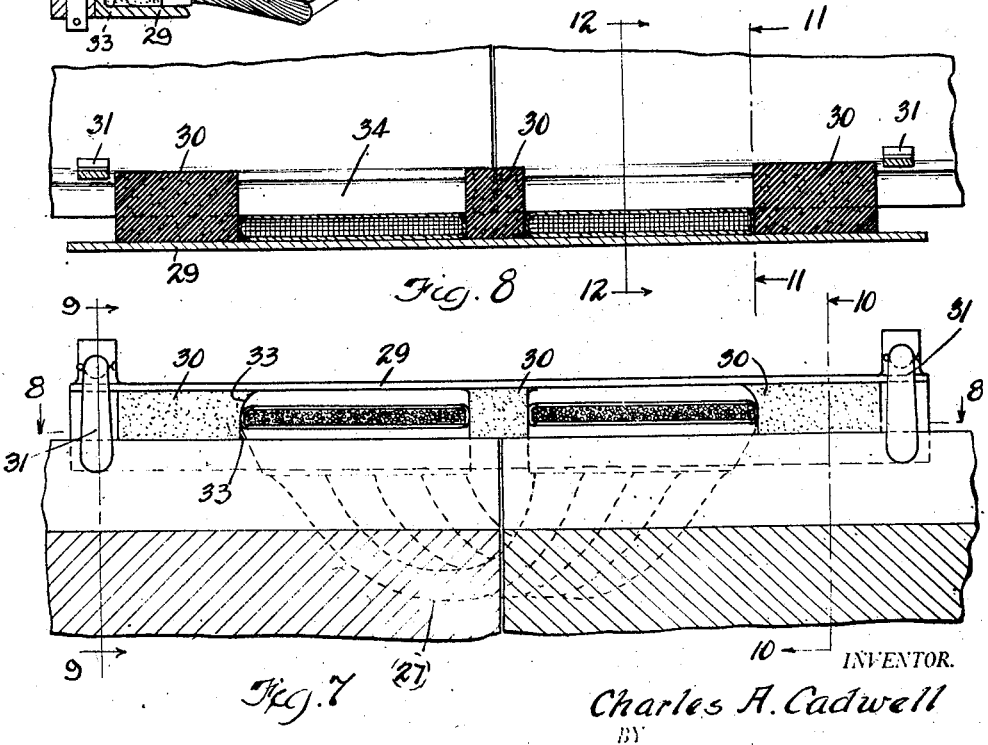
INVENTOR.
Charles A. Cadwell
BY
Fay, Oberlin & Fay
ATTORNEYS.

Sept. 10, 1935.     C. A. CADWELL     2,014,278

RAIL BONDING

Filed Dec. 5, 1929     3 Sheets-Sheet 3

INVENTOR.
Charles A. Cadwell
BY
Fay, Oberlin & Fay
ATTORNEYS.

Patented Sept. 10, 1935

2,014,278

UNITED STATES PATENT OFFICE 2,014,278

RAIL BONDING

Charles A. Cadwell, Cleveland, Ohio, assignor to The Electric Railway Improvement Company, Cleveland, Ohio, a corporation of Ohio Application December 5, 1929, Serial No. 411,712

3 Claims. (Cl. 173—278)

The present invention, relating, as indicated, to rail bonding, has more particular reference to the molten metal welding processes employed in attaching bond terminals to rails; and its principal object is the provision of an improved welding method; a bond terminal especially well adapted for use in connection with such method; and certain apparatus for facilitating the actual bending operation.

The welding of metals such as copper, which has a relatively high thermal conductivity, to metals such as iron which has a relatively lower thermal conductivity, is a very difficult operation when the necessary heat is being generated by a gas flame or a carbon arc. The surfaces to be welded together must be brought to the welding temperature by heating the work before the weld metal is applied and rare good judgment on the part of the operator must be exercised to bring two such unlike surfaces to the proper condition for welding and to secure a satisfactory result without injury to either body. Too little heat makes an imperfect weld and too much injures both the conductor and the rail.

Metallic arc welding produces a minimum heat effect in the bodies welded. In this method of welding, the application of heat to the surfaces of the bodies welded is simultaneous with the deposition of the weld metal; the high intensity flame of the arc and its small area make it possible to weld with very little penetration of the heat. For this reason, metallic arc welding is widely used on repair work and also for this reason it is very much more desirable for rail bonding than the methods above mentioned.

Heretofore however, there has been great difficulty in the application of copper arc welding to bonding in a manner to realize its minimum heat capabilities and, at the same time, to secure a satisfactory weld. Steel, being of slow heat conductivity, lends itself to simultaneous heating and welding without difficulty. Copper on the other hand behaves badly especially where placed in its position adjacent to the rail; for not only does copper, on account of its high thermal conductivity, fail to jump to the welding temperature under the extremely local arc flame, but the arc will leave its surface and concentrate on the more easily heated steel. It is impossible to make the arc play on the two surfaces at the same instant. In effecting a weld between the copper terminal of a bond and the steel of a rail, if the copper surface is disposed horizontally and the steel surface vertically, the arc flame will center on the steel and the molten drops of copper exuding from the copper welding rod, will fall to the copper surface beneath and chill without welding thereto; and, if the copper and steel surfaces are reversed in position, that is, the copper surface disposed vertically and the steel surface horizontally, the molten copper will weld to the steel but will be chilled by and fail to weld with the copper, unless, in either case, such copper is in the form of a relatively thin edge having an insufficient mass within a radius near enough to absorb the heat from the adjacent arc and the molten metal.

Copper bonds designed for welding to the rail by means of a steel arc are prepared with steel clad terminals. The metal iron, having a plastic condition between the solid and the molten states, lends itself in such a way that welding is easily accomplished against a surface in any position—even overhead. Details of steel arc bonds are, however, not at all adapted for copper arc welding. Copper having no plastic condition must be deposited in the fluid state and the tendency to flow away must be checked by freezing against the work, against an interposed dam, or by the surface tension of a large air chilled surface. The copper arc flame in bonding is directed against two different metal surfaces and it immediately singles out and concentrates on the hottest one.

Up to the present time, copper arc bonding against vertical rail surfaces has been accomplished largely by means of a refractory mold similar to that used in cast weld bonding. By introducing the ends of the copper conductor of a bond into the recess of a refractory mold through notches cut into the bottom or side wall in such a manner that the copper conductor is clamped against the rail by the recessed mold, the welding surfaces are disposed for application of the weld metal, and all of the difficulties mentioned above now apply. By use of a refractory such as carbon for the material of the mold, the arc may be manipulated so as to heat the copper conductor instead of covering it up with chilled metal, until fusion of the ends of the conductor is accomplished. A considerable thickness of wall or bottom for the mold is necessary in order to secure tightness and sufficient chill to prevent destructive fusion of the conductor body. The thickness of the wall of the mold, plus the extent to which the end of the copper conductor projects into the mold recess proper, must be subtracted from the welding area of the rail face, to find the actual welding space available. Such methods of bonding terminals to the relatively narrow vertical surfaces of a rail, do not provide a suitable contact, either as regards physical strength or electrical conductivity; the actual welded contact is little more than a line near the top of the rail face.

My invention, with the broad object of improving the welds produced by molten copper between copper bond terminals and steel rails, provides a bond of such form that the deposited metal and the heat from the arc can be utilized for preheating a preferably rather thin terminal during the initial part of the bonding operation when the operator's attention need only be concerned with securing a good weld between the deposited copper and the steel of the rail. This terminal is also of such form that subsequently, when the rising column of metal reaches the exposed ends or edges of the strands or laminations enclosed within the terminal sheath, such ends will have been preheated to such an extent as to make their welding to the fused copper and to the steel of the rail a simple matter as compared with this operation when effected by other methods and upon bond terminals of different designs.

For use in connection with the welding process and bond terminal just described, my invention contemplates the provision of a device for holding the bond and its terminals in proper position during the welding operation, this device employing dams for preventing escape of the deposited metal through the end openings of the spaces between the vertically situated parts of the terminals and the opposite faces of the rails, and having adjustable means for securing it and a bond in welding relation to the parts of the rails on which said faces occur.

To the accomplishment of the foregoing and related ends, said invention, then, consists of the means hereinafter fully described and particularly pointed out in the claims; the annexed drawings and the following description setting forth in detail certain means and one mode of carrying out the invention, such disclosed means and mode illustrating, however, but one of various ways in which the principle of the invention may be used.

In said annexed drawings:—

Figure 14:
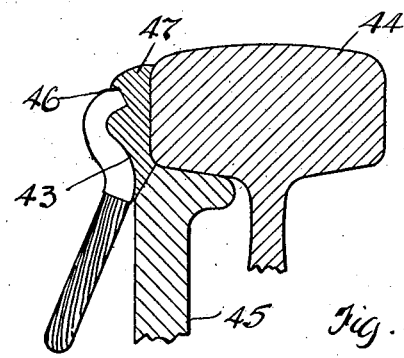
Figure 15:
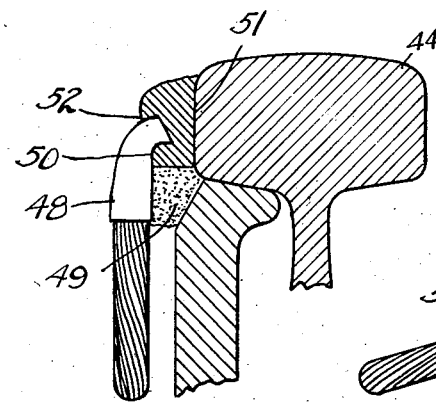
Figure 16:
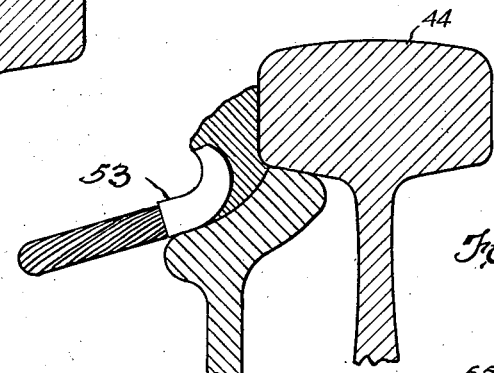
Figure 17:
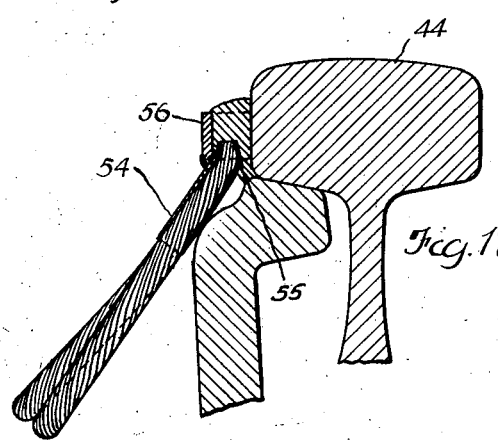
Figure 18:
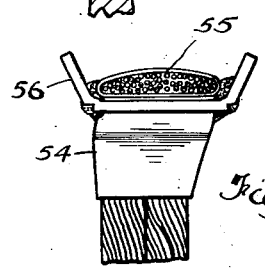

Fig. 1 is a plan view illustrating the appearance of one form of bond and retaining apparatus of the kind contemplated by this invention when positioned for welding the bond terminals to the vertical faces of the bases of the contiguous ends of two aligned rails of the heavy type generally employed for third rails; Fig. 2 is a vertical section taken on a plane indicated by the line 2—2 of Fig. 1; Fig. 3 is a transverse vertical section taken on the line 3—3 of Fig. 1; Fig. 4 is a vertical section taken on the line 4—4 of Fig. 2; Fig. 5 is a transverse vertical section taken on the line 5—5 of Fig. 2; Fig. 6 is a partly sectional end elevation illustrating a modified method of positioning bond terminals of the general type provided by this invention; Fig. 7 is a partly sectional plan view of a modified bond and retaining apparatus embodying the principles of my inention; Fig. 8 is a vertical section taken on a plane indicated by the line 8—8 of Fig. 7; Fig. 9 is a transverse vertical section taken on the line 9—9 of Fig. 7; Fig. 10 is a transverse vertical section taken on the line 10—10 of Fig. 7; Fig. 11 is a transverse vertical section taken on the line 11—11 of Fig. 8 and illustrates a method of double bonding; Fig. 12 is a transverse vertical section taken on the line 12—12 of Fig. 8 and shows a terminal after having been welded to the adjacent faces of a rail; Fig. 13 is a fragmentary sectional view illustrating a modification of the bond shown in Fig. 6; Fig. 14 is a sectional view showing a bond of the general type contemplated by my invention as modified for use on one of the vertical faces of the ball of a rail; Fig. 15 illustrates a further modification along the lines mentioned in describing Fig. 14; Fig. 16 shows a bond adapted for use in accordance with my invention when the rail ends are connected by tie plates of the design illustrated; Fig. 17 illustrates still another modified form of the bond; and Fig. 18 is an end elevation of the terminal of such bond.

In Figs. 1 to 5 inclusive, the improved bond contemplated is shown as comprising a conductor or body made up of one or more stranded or laminated cables 1, the number of such cables depending upon the conductive capacity desired. Around the ends of these cables are the sleeves or sheaths 2 which are preferably formed of the same metal as the enclosed cables, this metal being copper or other material having similar characteristics. The sleeves 2 are desirably flattened in order to extend the contact in a direction parallel to the rail length and at the same time make the terminal thinner and have their ends 4 turned or bent at an angle to the plane of the inner parts 5. The enclosed ends 6 of the conductor bodies 1 and the surounding sheaths 2 may, if necessary for obtaining some specified weld metal-copper or steel-copper contact ratio not had by the terminal ends when cut through diametrically, be sheared at an angle to their axes. Such parts may also be sheared in this manner for presenting inclined faces 7, such as shown in Figs. 1 and 3, but such faces, although desirable and well suited to the welding operation later explained, are not necessarily inclined but may be horizontally or otherwise disposed.

The bond positioning and retaining apparatus, shown in Figs. 1 to 5 inclusive, comprises a channel-shaped base or bottom 8 which is provided with upstanding posts 9, these latter being surrounded by sleeves 10 and carrying clamps 11 which are operated by suitable handles 12. The nuts 13 hold the clamps 11 loosely upon the posts 9 and are adjustable to permit of the use of the device as a whole upon rails having different base flange thicknesses. Mounted upon the bottom member 8 and secured in place by screws or the like 14 is the refractory or heat resistant lining 15 which has a forwardly extending ledge 16 for contacting with the bottoms of adjacent and aligned rail ends 17 and 18. This lining 15 also embodies pockets 19 for receiving the bond terminals in the manner illustrated, and dam walls 20, which serve to confine molten metal deposited in the spaces 21 formed between the inner sides 22 of the upturned terminal sleeves and the opposite faces 23 of the rails 17 and 18.

In positioning a bond preparatory to welding, its upturned terminals are placed in the lining pockets 19, as best shown in Fig. 1, and the ledge 16 is placed under the rail flanges; this, because of the limiting action of the abutting edges 24 of the dam walls 20, spacing the inner sides 22 of the upturned terminals from the faces 23 of the rail flanges. When now the clamps 11 are swung around by the handles 12 and engage with the top surface 25 of the rail flanges, the inner and horizontal parts 5 of the terminals will be brought into contact with the bottoms of the rails and their surfaces 26 form bottoms for the spaces 21. The assembly is now prepared and the welding operation can be effected, preferably in the manner hereinafter explained.

In Figs. 7 to 12 inclusive, a modified form of bond and a slightly different retaining device are shown. The bond 27 has four conducting cables 28 instead of two as in the preceding figures, and its terminals are substantially the same as those previously described. The retaining device comprises an angle-shaped base 29 which is provided with adjustable dam members 30 and slip-over clips 31 for coaction with the upper surfaces of the base flanges 32. As best shown in Fig. 7, the bond terminals, or rather their upturned end portions are received in the pockets 33 formed between the dams 30 and the metal base 29; their inside surfaces, as before, forming one of the walls and the bottoms of metal receiving spaces 34, and their shanks being clamped between the bottoms of the rails and the base 29. When secured in position in this manner, the terminals and rail faces 35 and 32 are ready for welding.

The actual welding operation may be carried out by using a welding flame or an arc for generating the heat required for melting the metal to be deposited and heating the bond terminals and the rail flanges, and any suitable metal may be employed for effecting a union; but, for reasons heretofore given, copper arc welding presents unusual difficulties which are avoided by my improved terminal design and welding process. Therefore, the following description applies to welding by arc melted deposited copper and especially to copper deposited from an electrode. Initially, the operator springs an arc between the copper electrode and the lower part of the face 23 (or 35). The molten copper exuded from the electrode falls on the surface 26 and that part of such metal, because of the high thermal conductivity and low temperature of the terminal sheath may cool, immediately and not adhere, at least sufficiently well to form a satisfactory weld. The part of the molten copper which comes into contact with the highly heated steel of the rail welds therewith and as deposition continues the operator concentrates attention on the vertical surface while, of course, filling in the space between the copper united with the steel and the confining wall 22. This wall and the surface 26 may chill a small part of the deposited copper at first, but as the column of metal rises, these surfaces, and especially that of the confining wall 22 become heated from the adjacent arc and heated or molten copper, so that, when such column reaches the inclined face 7, the operator will have no difficulty in effecting a good weld with the exposed ends 6, the rail faces 23 and 25 and the weld metal. Before the rising column reaches the butt wall or inclined and relatively thin edge 7, a considerable part of the inside face 22 will have welded to the copper as well as the surface 26, especially near its extreme inner and outer parts. As can be seen in Fig. 11, that part of the terminal sleeve just outside of the upper edge of the inclined face is near enough horizontal so that the surface tension of the metal will prevent its flowing away, but at the same time is inclined sufficiently to allow such metal to creep downward over the terminal sleeve to thereby form a continuous juncture between the sheath and weld metal.

The improved bond provided by my invention can also be positioned for welding in the manner illustrated in Fig. 6 wherein the outer recurved end of the terminal is forced over the adjacent edge of the rail preparatory to welding. This bond is self-retaining, i. e., no shelf or other device such as those shown in Figs. 1 and 7 is necessary for holding the bond; its gripping action on the rail suffices for this purpose. In welding, a fillet or seam of metal such as copper, for example, may be deposited or run into the trough between the rail face 36 and the inclined edge 37, this metal serving to unite such parts and therefore firmly secure the bond in place. The reduced thickness of the edge 37, its inclination, and the heat from the arc and molten metal insure a satisfactory union even where the welding metal is copper; and such metal, to prevent its escape from the open ends of the groove, may be dammed back by devices such as previously described, such devices, if desired, being supported and held in correct position by retaining means of the kind hereinbefore described.

A bond somewhat similar to that shown in Fig. 6 is illustrated in Fig. 13. Here the sheath 38, above its upper or clamping portion 39, is given an upward turn so as to raise the edge 40, which, like the edge 37 of the previous bond, is of reduced thickness, away from the steel of the rail and provide a pocket 41 within which metal may be preliminarily deposited to obtain a weld with the steel and to preheat the exposed conductor ends 42 before their actual union with the weld metal. As with the bond shown in Fig. 6, end dams can here be used for preventing escape of the welding metal, and if necessary supplementary clamping means may be used to assist in holding the terminals in correct position during welding.

In Figs. 14, 15, and 16, I show bonds of a modified type which are adapted for attachment to one of the vertical faces of the ball of a rail. The bond of Fig. 14 has a terminal which is formed in such a manner as to provide an inwardly curving wall 43, such wall with the opposite faces presented by the rail 44 and the tie plate 45 defining a cavity within which the welding may be initiated and a union effected with the steel during the time when the upper end of the terminal and specifically its edge 46 of reduced thickness which exposes the ends of the conductor wires or laminations is being preheated and prepared for its unition with the weld metal 47. The clamps and dams previously described may be easily modified to hold terminals of this kind in welding position and to prevent escape of the liquid metal. The bond shown in Fig. 15 in some respects is similar to the bond shown in Fig. 14, but its lower sheath 48 instead of directly coacting with the rail or the rail tie plate is of such form as to require the use of an interposed refractory bottom 49, such bottom in association with suitable end dams acting to prevent loss of the welding metal and defining with the inner sheath surface 50 and the rail surface 51 a cavity or pocket within which the original weld metal may be received and united with the steel. As the column of molten metal rises, the end or edge 52 of reduced thickness and its exposed conductor ends will become highly heated and prepared for welding in practically the same way as with those embodiments previously described. Fig. 16 illustrates a further bond modification particularly adapted for use in association with tie plates having a projecting portion which might interfere with the use of bonds of the kind just described. Such bond has a terminal sheath 53 which is curved in the manner shown in order to provide a confining wall and form a pocket, When this bond is clamped in position and suitable end dams positioned in sealing relation to the sides of the bond and the adjacent surfaces of the rail and its tie plate, an arc may be sprung at the bottom of the cavity so defined and metal deposited until the rising column can be carried laterally over the end of the sheath and over the exposed ends of the conductor strands, such ends, as before, being preferably reduced in thickness to permit of their effective preheating while the weld metal is being united with the steel and the molten column carried upwardly.

The modified construction of bond illustrated in Figs. 17 and 18 is likewise designed for use in association with tie plates having a projecting portion which the bond is required to clear. Such bond, like the one illustrated in Fig. 16, has a terminal sheath 54 which is curved to present an offset terminal portion 55. The latter, as before, presents an edge of reduced thickness for contact with the weld metal and for the purpose of confining the latter, such terminal portion has attached thereto a strip 56 of steel or other more refractory metal than the copper of which the bond and terminal sheath 54 are made, such strip rising above the terminal and having its ends bent forwardly so as to contact with the lateral face of the head of the rail 44. Accordingly, when the bond is properly positioned, an enclosure is provided in which the weld metal is received, the latter being directed initially across the reduced edge of said terminal portion 55 and finally accumulating until the space within the bent wall 56 is substantially filled.

From the foregoing description it will be apparent that my invention provides an improved rail bond terminal for use in the copper arc bonding process, and an improved method of effecting welds between copper and steel surfaces. The welding operation heretofore described can be expeditiously carried out; will result in improved unions; allows of the use of any vertical surface on a rail (the terminal shank being suitably formed); permits extending the terminal in one direction with the object of obtaining a thinner section more easily welded; permits of the use of all of the vertical surface, if necessary; and, as compared with mold and shelf methods, does not have bottom exposed ends that are liable to chill the deposited metal and prevent welding; nor wide spaces which permit the weld metal to subside away from the rail and carry chilled copper and steel into the weld.

Other modes of applying the principles of my invention may be employed instead of the one explained, change being made as regards the steps herein disclosed, provided those stated by any of the following claims or their equivalent be employed.

I therefore particularly point out and distinctly claim as my invention:—

1. A rail bond with a terminal formed of conductor strands having a sheath, said strands and sheath being cut to form a welding surface sloping relative to the upstanding surface of a rail to which said bond is to be secured and having a weld-metal receiving-trough below the welding surface, thereby providing means to increase the temperature of such bond and surface and thus form a firm weld.

2. A rail bond with a terminal formed of conductor strands having a sheath, said strands and sheath being cut to form a welding surface, said surface and the vertical surface of a rail to which said bond is to be secured forming a downwardly directed acute angle, said bond having a part thereof extending from said surface to a point beneath said rail thus forming a trough, whereby weld metal deposited in said trough prevents rapid heat conduction away from said welding surface.

3. A rail bond with a terminal formed of conductor strands having a sheath, said strands and sheath being cut to form a welding surface, said surface and the vertical surface of a rail to which said bond is to be secured forming a downwardly directed acute angle, there being means present to form a trough immediately below said weld surface, whereby weld metal deposited in said trough prevents rapid heat conduction away from said welding surface.

CHARLES A. CADWELL.